(12) United States Patent
Bahena et al.

(10) Patent No.: US 10,611,489 B2
(45) Date of Patent: Apr. 7, 2020

(54) EVACUATION SYSTEM WITH AN EXTENDABLE HEAD END

(71) Applicant: GOODRICH CORPORATION, Charlotte, NC (US)

(72) Inventors: Daniel Bahena, Phoenix, AZ (US); Timothy C. Haynes, Prescott Valley, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 335 days.

(21) Appl. No.: 15/603,897

(22) Filed: May 24, 2017

(65) Prior Publication Data

US 2018/0339779 A1    Nov. 29, 2018

(51) Int. Cl.
  *B64D 25/08* (2006.01)
  *B64D 25/14* (2006.01)
  *B64D 25/18* (2006.01)

(52) U.S. Cl.
  CPC ............. *B64D 25/14* (2013.01); *B64D 25/18* (2013.01)

(58) Field of Classification Search
  CPC ......... B64D 25/00; B64D 25/14; A62B 1/00; A62B 1/20; B63B 2027/141; B63B 2027/145
  See application file for complete search history.

(56) References Cited

U.S. PATENT DOCUMENTS

| | | | | |
|---|---|---|---|---|
| 2,936,056 A | * | 5/1960 | Heyniger | A62B 1/20 182/48 |
| 3,463,266 A | * | 8/1969 | Day | B64D 25/14 182/48 |
| 3,554,344 A | * | 1/1971 | Summer | B64D 25/14 193/25 B |
| 5,875,868 A | | 3/1999 | Smialowicz et al. | |
| 6,676,082 B2 | * | 1/2004 | Alberts | B64D 25/14 244/137.2 |
| 6,698,545 B2 | | 3/2004 | Baker et al. | |
| 6,814,183 B2 | | 11/2004 | Horvath et al. | |
| 8,215,586 B2 | | 7/2012 | O'Donnell et al. | |

(Continued)

FOREIGN PATENT DOCUMENTS

| EP | 1410987 A2 | * | 4/2004 | ............. B64D 25/14 |
|---|---|---|---|---|
| EP | 1410987 | | 12/2006 | |

OTHER PUBLICATIONS

European Patent Office, European Search Report dated Jul. 30, 2018 in Application No. 18173969.9-1010.

*Primary Examiner* — Richard R. Green
*Assistant Examiner* — Michael A. Fabula
(74) *Attorney, Agent, or Firm* — Snell & Wilmer, L.L.P.

(57) ABSTRACT

An evacuation slide assembly for an aircraft may comprise a main body configured to extend from a sill of the aircraft toward a surface within a range of angles relative to vertical when deployed so as to allow persons to safely slide down the main body to the surface. The main body may include a head end configured to attached to the sill of the aircraft, and a toe end opposite the head end. A first extendable portion may be coupled to the head end of the main body and may be in operable communication with a height sensor. The first extendable portion may be configured to deploy to adjust for a variation in a positional relationship between the surface and the sill to maintain the main body within the range of angles.

20 Claims, 8 Drawing Sheets

(56) References Cited

U.S. PATENT DOCUMENTS

| | | | |
|---|---|---|---|
| 9,751,635 B2* | 9/2017 | Heuer | B64D 45/0005 |
| 9,809,316 B2* | 11/2017 | Hartman | B64D 25/14 |
| 9,914,544 B2* | 3/2018 | Hartman | B64C 1/1461 |
| 2003/0080254 A1* | 5/2003 | Alberts | B64D 25/14 244/137.2 |
| 2007/0045473 A1 | 3/2007 | Clegg et al. | |
| 2010/0258677 A1* | 10/2010 | O'Donnell | B64D 25/14 244/137.2 |
| 2017/0050737 A1 | 2/2017 | Hartman et al. | |
| 2018/0186461 A1* | 7/2018 | Haynes | B64D 25/14 |

* cited by examiner

EVACUATION SYSTEM WITH AN EXTENDABLE HEAD END

FIELD

The present disclosure relates to emergency evacuation equipment for aircraft and, more specifically, to extendable inflatable devices for evacuation systems.

BACKGROUND

Evacuation systems of aircraft may include an inflatable flotation device, such as an evacuation slide, and an aspirator for inflating the inflatable flotation device. Inflatable flotation devices may be designed to be detached from the corresponding aircraft or permanently attached to the aircraft. In that regard, the inflatable flotation devices may provide a ramp from a sill of the aircraft to a ground surface which may include water or land. A slope of the inflatable flotation device may vary based on an angle of the aircraft upon landing or based on characteristics of the landing surface.

SUMMARY

An evacuation slide assembly for an aircraft comprises a main body including a head end configured to attached to a sill of the aircraft, and a toe end opposite the head end. The main body is configured to extend from the sill of the aircraft toward a surface within a range of angles relative to vertical when deployed so as to allow persons to safely slide down the main body to the surface. A first extendable portion is coupled to the head end of the main body and is in operable communication with a height sensor. The first extendable portion is configured to deploy to adjust for a variation in a positional relationship between the surface and the sill to maintain the main body within the range of angles.

In various embodiments, a first cutter may be configured to actuate and release the first extendable portion in response to the height sensor determining at least one of a distance between the sill and the surface, a roll angle of the aircraft, a pitch angle of the aircraft, or an angle of the main body relative to vertical exceeds a first threshold. The first cutter may comprise a first knife edge and a second knife edge. The first knife edge may be configured to be driven towards the second knife edge in response to actuation of the first cutter. The first cutter may comprise a pyrotechnic package.

In various embodiments, a second extendable portion may be coupled to the main body. A second cutter may be configured to actuate in response to the height sensor determining the at least one of the distance between the sill and the surface, the roll angle of the aircraft, the pitch angle of the aircraft, or the angle of the main body relative to vertical exceeds a second threshold different from the first threshold.

In various embodiments, at least one thread may be configured to lace a first segment and a second segment of the first extendable portion together. A pin may be coupled to the first cutter. The pin may be coupled to at least one thread and configured to loosen the at least one thread to allow the first extendable portion to extend. In various embodiments, the first extendable portion may include an extendable tube in fluid communication with the main body and configured to receive pressurized air from the main body and inflate in response to the at least one thread being loosened.

In various embodiments, the first segment of the first extendable portion may comprise a first distal end and a first proximal end opposite the first distal end. The second segment of the first extendable portion may comprise a second distal end and a second proximal end opposite the second distal end. The first distal end may be configured to be adjacent the second distal end when the first extendable portion is in a packed state and to be distal the second distal end when the first extendable portion is in an extended state.

In various embodiments, the first distal end and the second distal end may each define a plurality of openings. The at least one thread may be configured to extend through each of the plurality of openings and form corresponding loops in a first direction. Each loop may be configured to be threaded through an adjacent loop. A last loop may be configured to be coupled to the pin such that the pin releases the last loop in response to actuation of the first cutter.

An evacuation system for an aircraft is provided, in accordance with various embodiments. An evacuation system for an aircraft may comprise an evacuation slide assembly comprising a main body including a head end configured to attached to a sill of the aircraft, and a toe end configured to extend toward a surface when the main body is deployed, and an extendable portion coupled to the main body. A height sensor may be configured to determine at least one of a distance between the sill and the surface, a roll angle of the aircraft, a pitch angle of the aircraft, or an angle of the main body relative to vertical. A release mechanism may be coupled to the extendable portion and configured to actuate in response to the height sensor determining the at least one of the distance between the sill and the surface, the roll angle of the aircraft, the pitch angle of the aircraft, or the angle of the main body relative to vertical exceeds a predetermined threshold.

In various embodiments, the extendable portion may include an extendable tube in fluid communication with the main body and configured to receive pressurized air from the main body. The extendable portion may further comprise a first segment having a first distal end and a first proximal end opposite the first distal end, and a second segment having a second distal end and a second proximal end opposite the second distal end. The first distal end may be configured to be adjacent the second distal end when the extendable portion is in a packed state and to be distal the second distal end when the first extendable portion is in an extended state.

In various embodiments, the first distal end and the second distal end may each define a plurality of openings. At least one thread may configured to extend through each of the plurality of openings and form corresponding loops in a first direction. Each loop may be configured to be threaded through an adjacent loop. A last loop may be coupled to a pin. The pin may be coupled to the release mechanism.

In various embodiments, the release mechanism may comprise a cutter including a first knife edge and a second knife edge. The first knife edge may be configured to be driven towards the second knife edge in response to actuation of the cutter. The release mechanism may comprise a pyrotechnic package.

An evacuation system for an aircraft is provided, in accordance with various embodiments. An evacuation system for an aircraft may comprise an evacuation slide assembly comprising a main body having a head end and a toe end. The head end may be configured to be nearer the aircraft than the toe end when the evacuation slide assembly is deployed. An extendable portion may be in operable communication with the main body and may be configured to alter an angle of the main body relative to vertical when the evacuation slide assembly is deployed such that the angle is maintained within a selected range.

In various embodiments, a height sensor may be in operable communication with a release mechanism of the extendable portion. At least one thread may be configured to lace at least a first segment and a second segment of the extendable portion together. A pin may be coupled to the at least one thread and configured to loosen the at least one thread to allow the extendable portion to extend in response to an actuation of the release mechanism of the extendable portion. In various embodiments, the release mechanism of the extendable portion may comprise a pyrotechnic package.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion.

As used herein, "distal" refers to the direction outward, or generally, away from a reference component. As used herein, "proximal" and/or "proximate" refers to a direction inward, or generally, towards the reference component.

As used herein, "electronic communication" means communication of electronic signals with physical coupling (e.g., "electrical communication" or "electrically coupled") or without physical coupling and via an electromagnetic field (e.g., "inductive communication" or "inductively coupled" or "inductive coupling"). In that regard, use of the term "electronic communication" includes both "electrical communication" and "inductive communication."

The present disclosure relates to evacuation devices, such as slides, slide rafts, life rafts, or other inflatable evacuation devices, having one or more extendable portion(s). The extendable portions may have a plurality of segments coupled together. A height sensor may be in operable communication with a release mechanism, for example, a pyrocutter, configured to actuate in response to the height sensor determining a distance from an exit surface (e.g., the ground), a roll angle of the aircraft, a pitch angle of the aircraft, or an angle of the slide relative to vertical exceeds a predetermined value. As used herein, the term "vertical" refers to the direction associated with gravity. Upon actuation of the release mechanism, the extendable portion may convert to an extended state thereby causing a toe end of the inflatable device to contact the exit surface and/or causing an angle of the toe end relative to the exit surface and/or relative to vertical to decrease.

Figure 1:
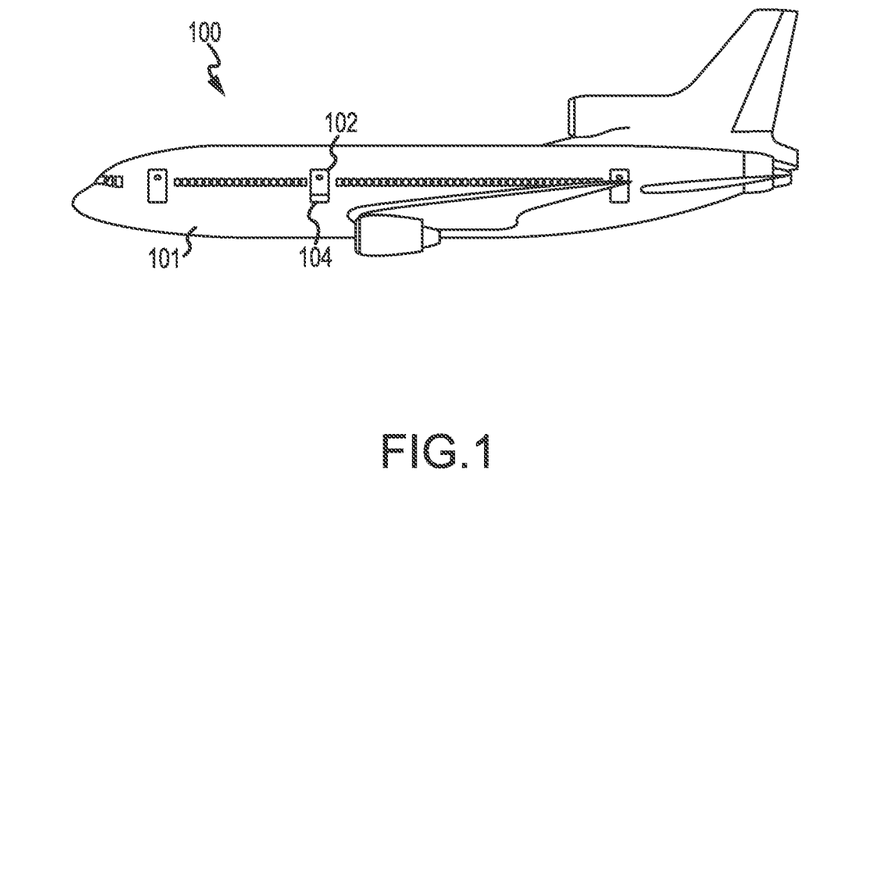
FIG. 1 illustrates an aircraft having an exit door and an evacuation system, in accordance with various embodiments.

Referring now to FIG. 1, an aircraft 100 is shown. Aircraft 100 may include a fuselage 101 having a plurality of exit doors including an exit door 102. Aircraft 100 may include one or more evacuation systems positioned near a corresponding exit door. For example, aircraft 100 includes an evacuation system 104 positioned near exit door 102.

Evacuation system 104 may be removably coupled to fuselage 101. In the event of an emergency, exit door 102 may be opened by a passenger or crew member of aircraft 100. In various embodiments, evacuation system 104 may deploy in response to exit door 102 being opened and, in various embodiments, evacuation system 104 may deploy in response to another action taken by a passenger or crew member such as depression of a button or actuation of a lever.

Figure 2:
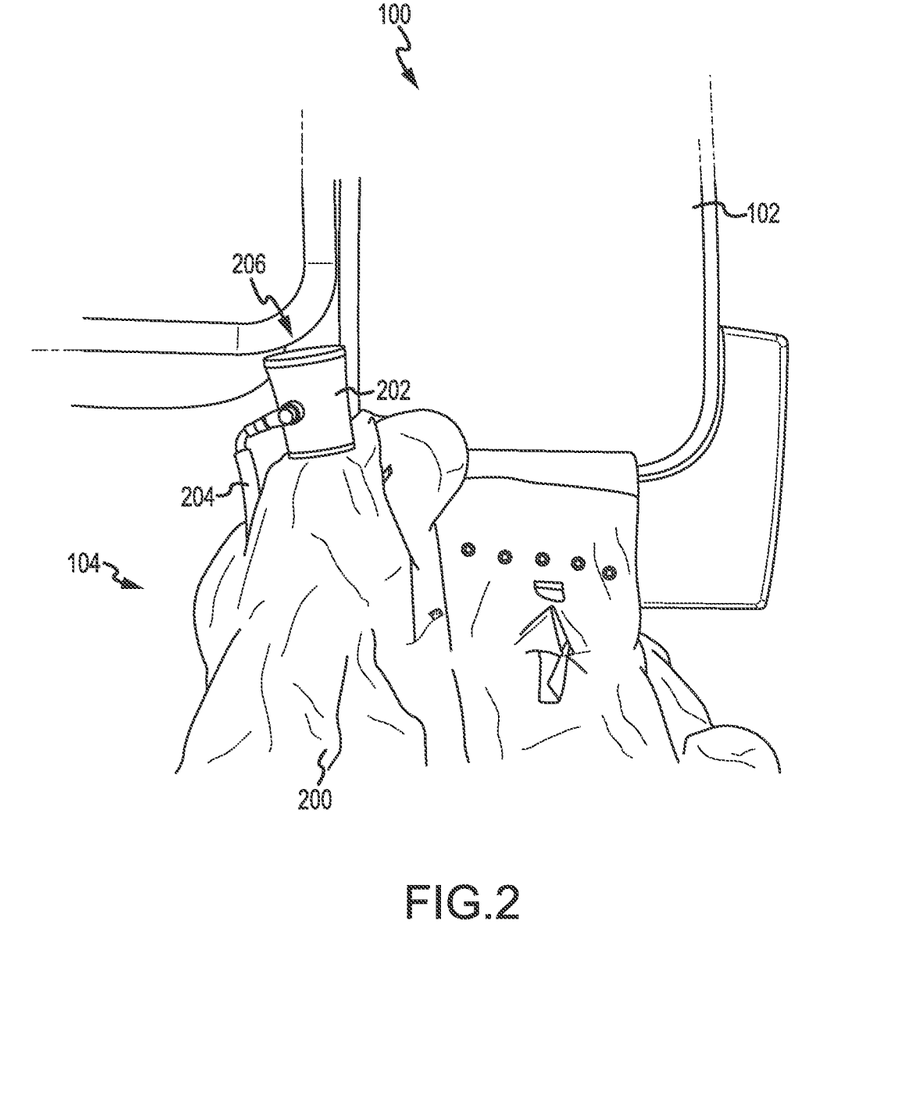
FIG. 2 illustrate the evacuation system of FIG. 1 including an evacuation slide, in accordance with various embodiments.

Turning to FIG. 2, additional details of evacuation system 104 are illustrated, according to various embodiments. In particular, evacuation system 104 includes an evacuation slide 200. Evacuation slide 200 may be an inflatable device. Evacuation slide 200 may inflatable and may be fluidly coupled to a source of forced gas 206. The source of forced gas 206 may cause a gas to enter evacuation slide 200 to inflate evacuation slide 200. Evacuation slide 200 may be coupled to fuselage 101 of FIG. 1, and may be decoupled from fuselage 101 in response to being fully inflated or to being manually detached in order to allow passengers and/or crew members to safely float away from the aircraft 100 of FIG. 1. In various embodiments, evacuation slide 200 may be permanently coupled to fuselage 101. In various embodiments, evacuation slide 200 may be configured to extend from fuselage 101 and make contact with a surface, upon which aircraft 100 has landed, within a range of angles when deployed so as to allow persons to safely slide down the surface.

Source of forced gas 206 may include an aspirator 202 coupled to evacuation slide 200, piping 204 coupled to aspirator 202, and a compressed fluid source coupled to the piping 204. Under normal operating conditions, the evacuation slide 200 may be deflated and stored within a compartment of aircraft 100. In various embodiments, evacuation slide 200 and aspirator 202 may be stored in a single package within the aircraft compartment. In response to deployment of evacuation system 104, fluid may flow into aspirator 202 via piping 204 at a relatively high velocity. This fluid flow may cause aspirator 202 to draw gas from the environment. The fluid flow (such as in a gaseous state) and the environmental gas may be directed into evacuation slide 200. In response to receiving the fluid flow and the environmental gas, evacuation slide 200 may begin to inflate.

Figure 3:
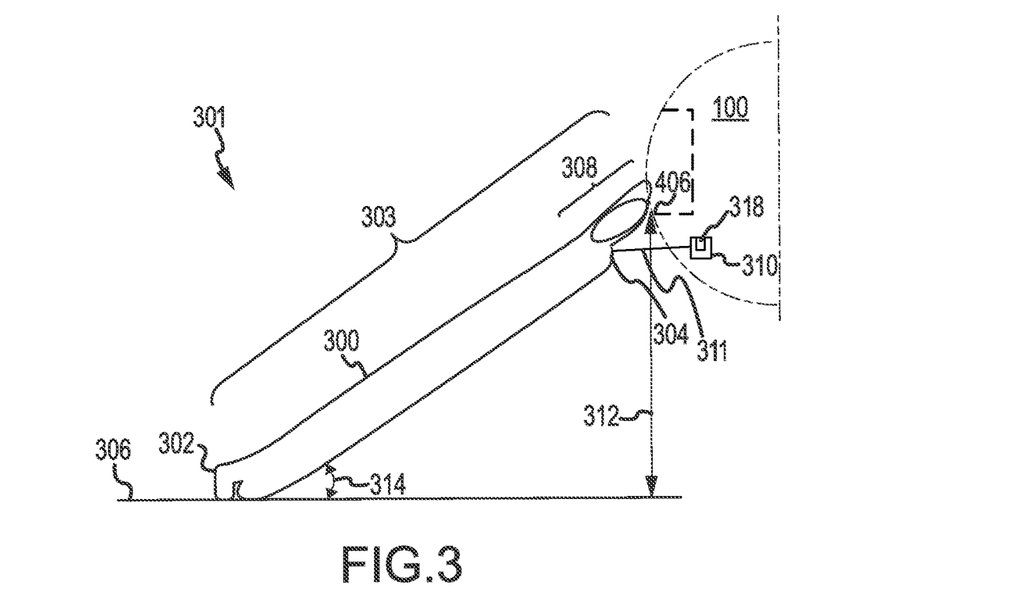
FIG. 3 illustrates an evacuation system comprising an evacuation slide assembly having an extendable portion coupled to a height sensor, in accordance with various embodiments.

Turning now to FIG. 3, evacuation system 301 including evacuation slide assembly 303 and height sensor 310 is illustrated, according to various embodiments. Evacuation slide assembly 303 may include a main body 300 and an extendable portion 308. Main body 300 may define a volume capable of receiving gas from aspirator 202 of FIG. 2. Main body 300 may further define a surface on which passengers may rest in response to evacuation slide assembly 303 being detached from aircraft 100. Main body 300 may include a distal end 302 (also referred to as a toe end) and a proximal end 304 (also referred to as a head end) opposite distal end 302. Head end 304 may be positioned proximate aircraft 100 in response to evacuation slide assembly 303 being deployed. Head end 304 may be attached to a sill 406 of aircraft 100. With momentary reference to FIG. 4, it is noted that extendable portion 308 is located towards the head end 304 of main body 300, near a girt bar 408 that is coupled to a location near sill 406 of aircraft 100. In that regard, extendable portion 308 may be extended, in various embodiments, early in the deployment process of main body 300, thus improving the deployment process. In that regard, extendable portion 308 may be extended, via the processes and systems described herein, during the beginning stages of deployment of main body 300. Such early extension of extendable portion 308 may be facilitated by, for example, electronics that may quickly determine a sill height, a pitch angle of the aircraft, a roll angle of the aircraft, or an angle of slide relative to vertical and thus quickly cause extension of extendable portion 308 during deployment. Moreover, other advantages may be achieved by locating extendable portion 308 at such a location.

Evacuation system 301 may include a height sensor 310. Height sensor 310 may be mounted in any suitable location in aircraft 100, such as in fuselage 101 or in a wing. Height sensor 310 may be mounted in fuselage 101, for example, near a door or in a door of fuselage 101. In various embodiments, height sensor 310 may be included on evacuation slide assembly 303. Height sensor 310 may comprise any suitable apparatus for determining the height of sill 106 (i.e., a distance 312 between sill 406 and surface 306) and/or the pitch angle of aircraft 100, and/or the roll angle of aircraft 100, and/or the angle 324 of main body 300 relative to vertical (i.e., relative to arrow 326). In various embodiments, height sensor 310 may comprise an accelerometer, a solid state inclinometer, an optical or infrared distance measuring device, a mercury switch, or any suitable other sensor. Height sensor 310 may also include a controller 318 or other electronics configured to perform an action in response to the height and/or pitch and/or roll determined by height sensor 310.

A controller 318 of height sensor 310 may comprise one or more processors configured to implement various logical operations in response to execution of instructions, for example, instructions stored on a non-transitory, tangible, computer-readable medium. The one or more processors can be a general purpose processor, a microprocessor, a microcontroller, a digital signal processor (DSP), an application specific integrated circuit (ASIC), a field programmable gate array (FPGA) or other programmable logic device, discrete gate or transistor logic, discrete hardware components, or any combination thereof.

Height sensor 310 may comprise system program instructions and/or controller instructions that may be loaded onto a non-transitory, tangible computer-readable medium having instructions stored thereon that, in response to execution by a controller 318, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in *In Re Nuijten* to fall outside the scope of patentable subject matter under 35 U.S.C. § 101.

In that regard, height sensor 310 may be configured to determine a height and/or pitch and/or roll of aircraft 100 and, should the value of the height and/or pitch and/or roll of aircraft 100 exceed a predetermined threshold (e.g., a predetermined height and/or predetermined angle or predetermined pitch and/or predetermined roll), height sensor 310 may be configured to take various actions, as described below. For example, height sensor 310 may be configured to send an electronic signal to a release mechanism of extendable portion 308, as described in further detail below.

Height sensor 310 may be in electronic communication with components of evacuation system 301 (e.g., a release mechanism of extendable portion 308) via wire 311. Wire 311 may be configured to carry electronic signals in response to a command from height sensor 310.

In response to aircraft 100 landing on a surface 306 during an emergency landing, it is desirable for the evacuation slide assembly 303 to deploy and provide an egress for passengers to access surface 306. Depending on the terrain, a distance 312 sill 406 to surface 306 may vary. In that regard, it is undesirable for an angle 314, or a slope, of main body 300 relative to surface 306 be relatively large, such as greater than 40 degrees, 45 degrees, 60 degrees, 75 degrees, or the like. In this regard, it is undesirable for an angle 324 of main body 300 relative to vertical (i.e., relative to arrow 326) to be relatively large, such as greater than 130 degrees, 135 degrees, 150 degrees, 165 degrees, or the like. Height sensor 310 may determine such angle 314 and/or distance 312, and/or angle 324. Angle 314 and angle 324 may be influenced by the roll angle and/or the pitch angle of aircraft 100.

In that regard, extendable portion 308 may extend to increase a total length of evacuation slide assembly 303 in response to distance 312 between surface 306 and sill 406 being equal to or greater than a threshold distance. In various embodiments, the threshold distance may correspond to a distance at which the angle 314 and/or the angle 324 of main body 300 is greater than a predetermined angle. For example, extendable portion 308 may extend if angle 314 is greater than 40 degrees or if angle 324 is greater than 130 degrees. Extendable portion 308 may extend if angle 314 is greater than 50 degrees or if angle 324 is greater than 160 degrees. The predetermined angle may be derived from the height and/or the pitch and/or the roll of aircraft 100. For example, the predetermined angle may be the roll angle of the aircraft, for example, the roll angle with respect to the landing surface. The predetermined angle may be the pitch angle of the aircraft, for example, the pitch angle with respect to the nose of aircraft 100 and the landing surface.

In response to distance 312, the roll angle, the pitch angle, or the main body 300 angle exceeding the predetermined threshold, height sensor 310 may send a signal, via wire 311, to a release mechanism 711 (with momentary reference to FIG. 7), causing release mechanism to actuate thereby. In various embodiments, release mechanism 711 may include a cutter, for example, a pyro-cutter. In response to the actuation of release mechanism 711, extendable portion 308 may convert to an extended state. In that regard, extendable portion 308 may remain compressed in response to distance 312 and/or angle 324 being less than or equal to a predetermined distance and/or predetermined angle and may extend in response to distance 312 and/or angle 324 being greater than the predetermined distance and/or predetermined angle.

Figure 4:
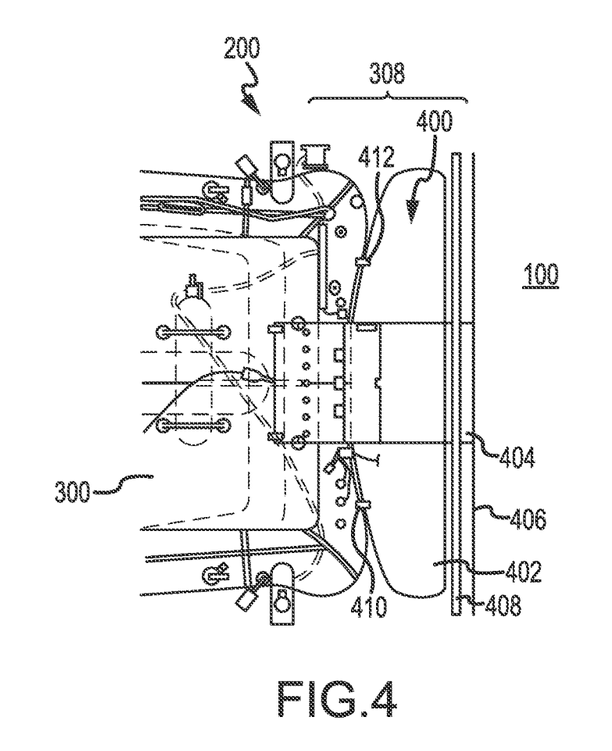
FIG. 4 illustrates the extendable portion of the evacuation slide assembly of FIG. 3 including a plurality of segments and an extendable tube, in accordance with various embodiments.

Turning now to FIG. 4, additional details of the extendable portion 308 are shown, in accordance with various embodiments. Extendable portion 308 may include a plurality of segments 400. The plurality of segments 400 may be folded over each other and woven together. Extendable portion 308 may further include an extendable tube 402. Extendable tube 402 may be positioned between two or more of the plurality of segments 400.

In various embodiments, each of the plurality of segments 400 may include a relatively durable material or combination of materials such as a single ply nylon base cloth. In various embodiments, each of the plurality of segments 400 may include a single ply nylon base cloth along with a gray neoprene coating on a top side and a conductive white neoprene coating on a bottom side.

In response to inflation of main body 300, the plurality of segments 400 may remain folded over each other and woven together. Thus, extendable tube 402 may remain compressed between the two or more of the plurality of segments 400. In response to the lacing between the plurality of segments 400 becoming loose, the plurality of segments 400 may unfold, thus extending a length of extendable portion 308. In response to the plurality of segments 400 unfolding, extendable tube 402 has room to expand.

Extendable tube 402 may be in fluid communication with main body 300 via a plurality of communication holes including a first communication hole 410 and a second communication hole 412. In response to the plurality of segments 400 unfolding, extendable tube 402 may receive gas via communication holes 410, 412 and inflate. Thus, in response to the lacing between the plurality of segments 400 becoming loose, extendable portion 308 may extend and inflate, increasing a total length of evacuation slide assembly 303.

In various embodiments, extendable portion 308 may be considered to be a part of a girt. In that regard, extendable portion 308 may be coupled to a girt sleeve 404. A girt bar 408 may be coupled to a location near a sill 406 of aircraft 100. Girt sleeve 404 may define an annular volume to be positioned around girt bar 408. In response to all passengers evacuating aircraft 100, extendable portion 308 may be separated from girt sleeve 404 in order to separate evacuation slide assembly 303 from aircraft 100.

Figure 5A:
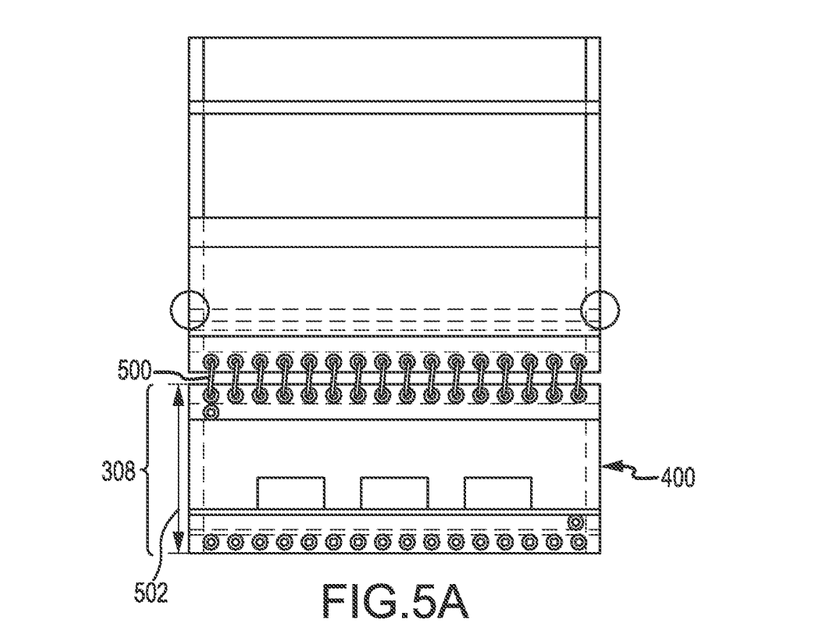
FIG. 5A illustrates the plurality of segments of the extendable portion of FIG. 4 in a packed state, in accordance with various embodiments.

Turning now to FIG. 5A, additional details of extendable portion 308 are shown, in accordance with various embodiments. Extendable portion 308 may include the plurality of segments 400. As shown in FIG. 5A, the plurality of segments 400 are folded over each other. At least one thread 500 may be utilized to lace at least two of the plurality of segments 400 together. As shown, the plurality of segments 400 has a first length 502 in response to the plurality of segments 400 being laced together. In various embodiments, the first length 502 may be between 5 inches (12.7 cm) and 20 inches (50.8 cm), between 10 inches (25.4 cm) and 14 inches (35.5 cm), or the like. The at least one thread 500 may include one or more of a thread, a string, a rope, a cable, or any other malleable and linear object.

Figure 5B:
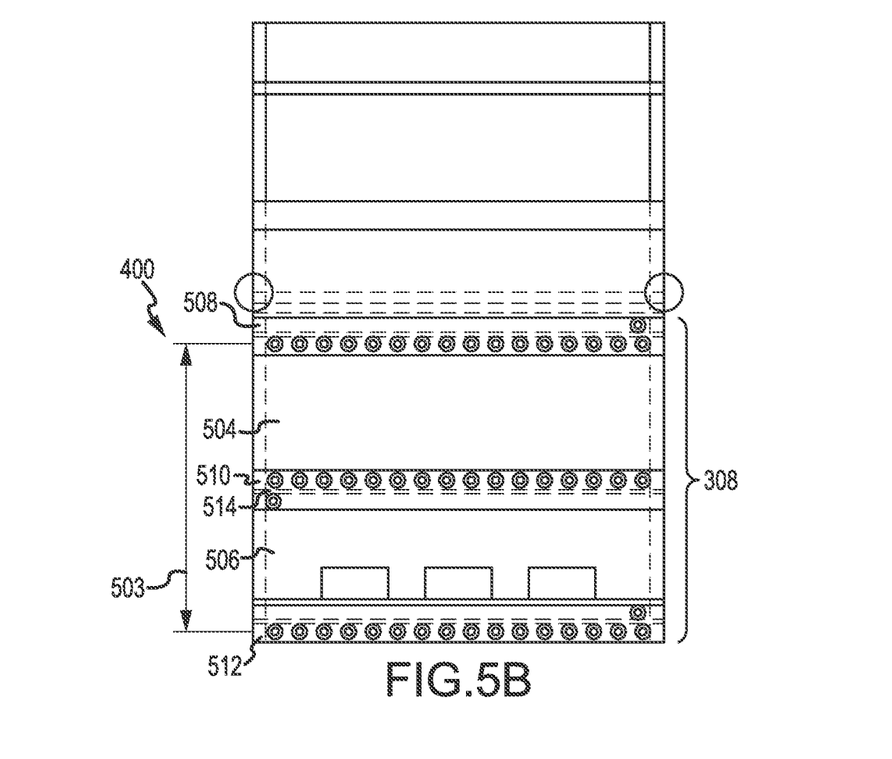
FIG. 5B illustrates the plurality of segments of the extendable portion of FIG. 4 in an extended state, in accordance with various embodiments.

Referring now to FIGS. 5A and 5B, the plurality of segments 400 may include a first segment 504 and a second segment 506. First segment 504 may have a first distal end 508 and a first proximal end 510. Second segment 506 may have a second distal end 512 and a second proximal end 514. In response to the plurality of segments 400 being extended, first proximal end 510 may be positioned adjacent to second proximal end 514, and first distal end 508 may be positioned distal to second distal end 512. Accordingly, extendable portion 308 may have a second length 503 in response to extendable portion 308 being extended. In various embodiments, second length 503 may be approximately twice first length 502, such as within 25 percent (25%) or ten percent (10%) of first length 502.

In a packed state, the plurality of segments 400 may be folded over each other. First proximal end 510 may be positioned adjacent to second proximal end 514, first distal end 508 may be positioned adjacent to second distal end 512, and first distal end 508 may be laced together with second distal end 512 via the at least one thread 500.

Figure 6:
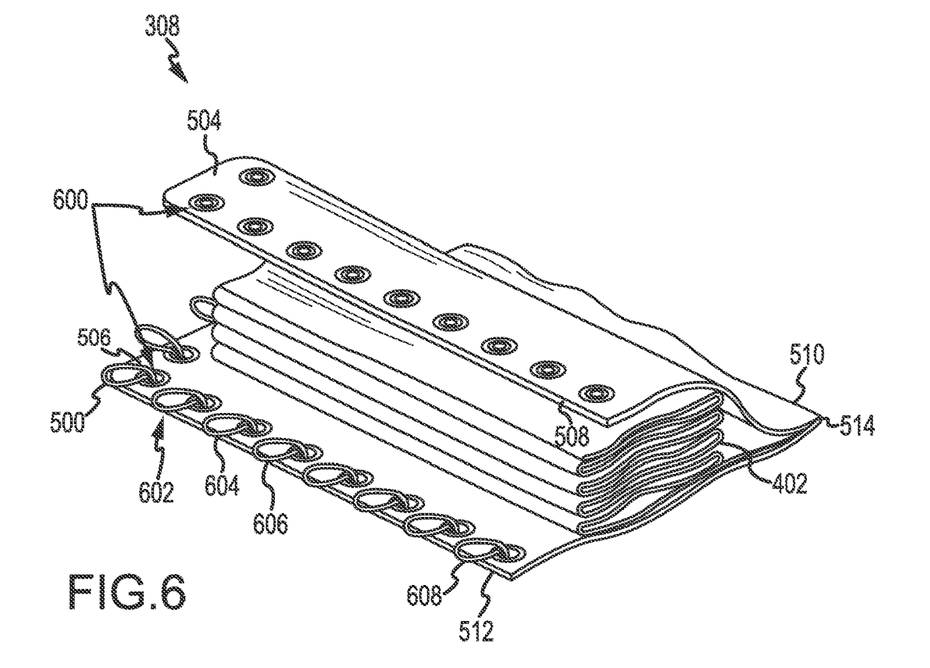
FIG. 6 illustrates the plurality of segments of the extendable portion of FIG. 4 in a partially packed state, in accordance with various embodiments.

Turning now to FIG. 6, additional details of extendable portion 308 are shown, in accordance with various embodiments. As shown, first segment 504 and second segment 506 each define a plurality of openings 600 extending along their corresponding distal end 508, 512. Likewise, FIG. 6 illustrates that first proximal end 510 may be coupled to second proximal end 514, such as permanently coupled.

The at least one thread 500 may be extended through each of the plurality of openings 600 of each of the segments 504, 506 to form a plurality of loops 602. Each of the plurality of loops 602 may be oriented in the same direction. The plurality of loops 602 may include a first loop 604, a second loop 606, and a last loop 608. In order to pack extendable portion 308, extendable tube 402 may be positioned between first segment 504 and second segment 506.

Figure 7:
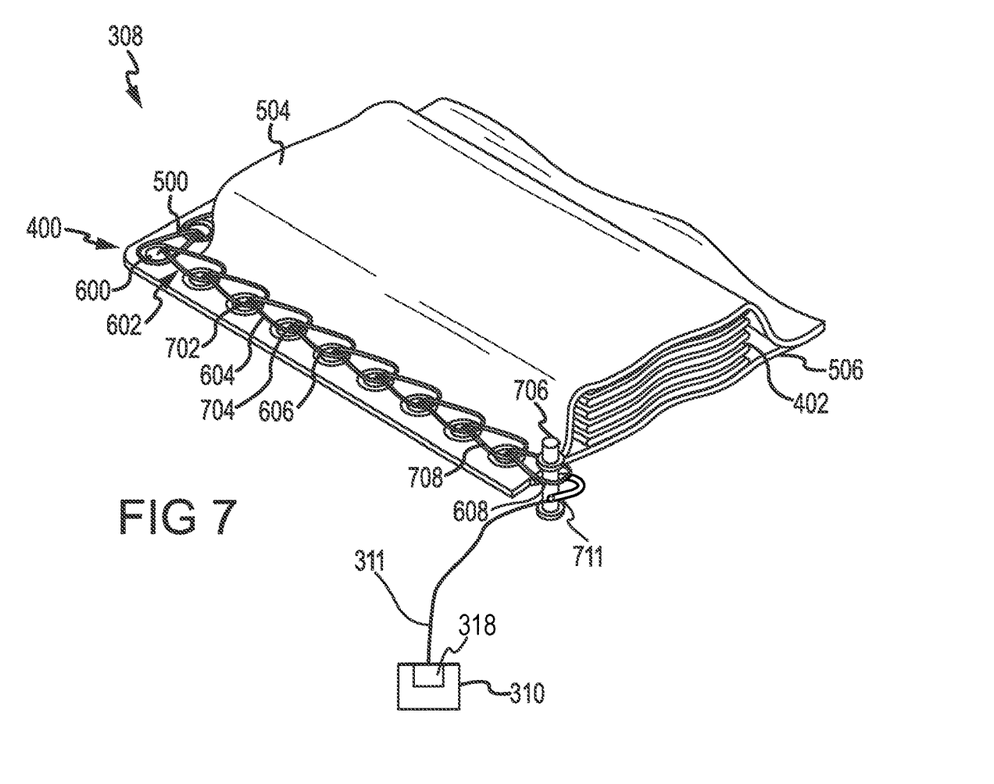
FIG. 7 illustrates the plurality of segments of the extendable portion of FIG. 4 in a fully packed state, in accordance with various embodiments.

Turning now to FIG. 7, extendable portion 308 is shown as fully packed. In that regard, the at least one thread 500 may have complete loops 602 that each extend through one of the plurality of openings 600 of first segment 504 and a corresponding opening 600 of second segment 506. Each of the plurality of loops 602 may extend through a pair of the plurality of openings 600 and be threaded through an adjacent loop. For example, first loop 604 may extend through a first opening 702, and second loop 606 may extend through a second opening 704. Second loop 606 may be threaded through first loop 604.

After the plurality of loops 602 have been threaded together in this manner, a pin 706 may be extended through last loop 608. Pin 706 may be coupled to release mechanism 711. In that regard, in response to release mechanism 711 actuating, pin 706 is split or shorn, and thus pin 706 may be removed from last loop 608. In response to pin 706 being removed from last loop 608, last loop 608 may be loosened from a next to last loop 708, which then may be loosened from a following loop until each of the plurality of loops 602 is loosened from each of the other loops 602. In that regard, first segment 504 and second segment 506 may be separated from each other, allowing extendable portion 308 to extend, thus allowing extendable tube 402 to fill with gas and likewise extend.

Figure 8A:
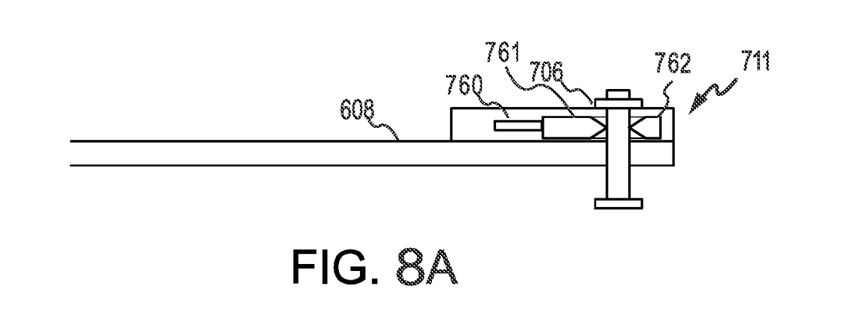
FIGS. 8A and 8B illustrate a release mechanism of the evacuation slide assembly of FIG. 3 in a packed state and a spent state, respectively, in accordance with various embodiments.
Figure 8B:
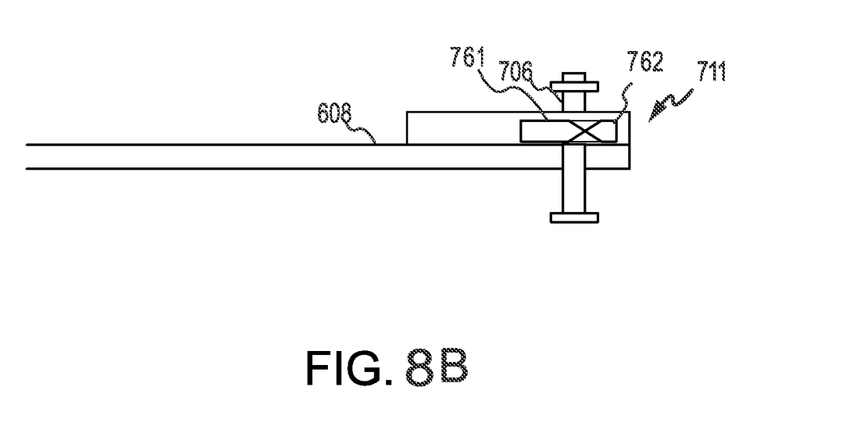

With reference to FIG. 8A and FIG. 8B, views of release mechanism 711 are shown in a pre-actuated state and an actuated state, respectively. In FIG. 8A, release mechanism 711 is shown in a pre-actuated state, which also may be referred to as a packed state. In FIG. 8B, release mechanism 711 is shown in a actuated state, which also may be referred to as a spent state. In the packed state, pin 706 is whole and disposed in loop 608. In various embodiments, release mechanism 711 comprises a cutter, for example, a pyro-cutter having a knife edge 761, a knife edge 762, and a pyrotechnic package 760. Upon actuation, pyrotechnic package 760 causes a rapid expansion of gas. For example, upon actuation, pyrotechnic package 760 may cause a firing circuit within pyrotechnic package 760 to initiate a squib of pyrotechnic package 760, which, in turn, initiates a pyrotechnic composition of pyrotechnic package 760. The pyrotechnic composition burns rapidly and causes a rapid gas expansion. The commencement of the release of the rapidly expanding gas may be referred to as detonation. The expanding gas drives knife edge 761 through pin 706, causing pin 706 to shear or split. Pin 706 is shown in FIG. 8B after shearing. After shearing, pin 706 may become dislodged from loop 608, permitting the lacing to unravel.

Figure 9:
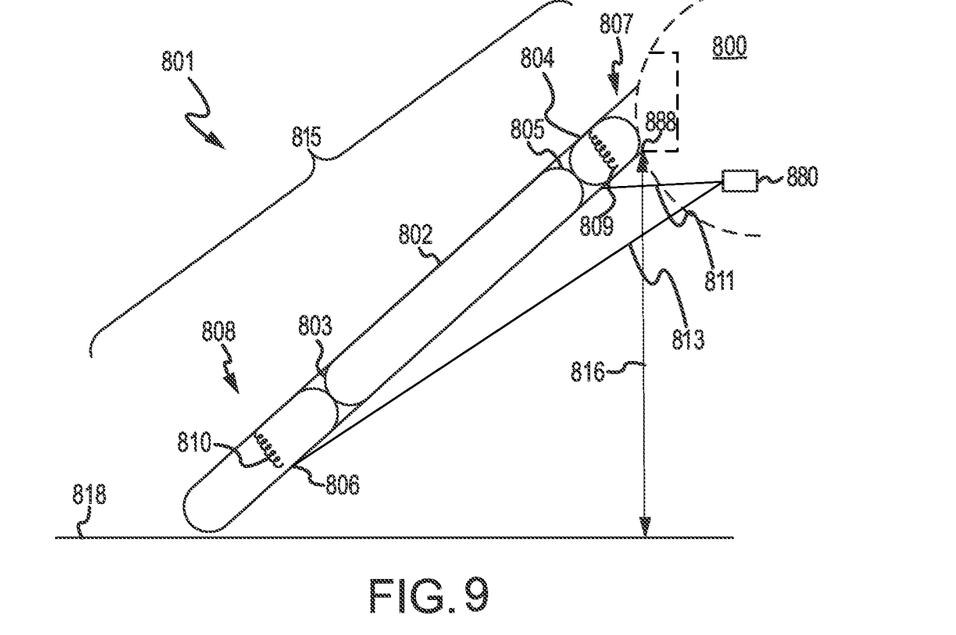
FIGS. 9, 10A, and 10B illustrate an evacuation system comprising an evacuation slide assembly having multiple extendable portions, in accordance with various embodiments.

Turning now to FIG. 9, an evacuation system 801 for aircraft 800 including an evacuation slide assembly 815 is illustrated, according to various embodiments. Evacuation slide assembly 815 may include multiple extendable portions including a first extendable portion 804 and a second extendable portion 806. Evacuation slide assembly 815 may further include a main body 802 having a toe end 803 and a head end 805. First extendable portion 804 may be coupled to head end 805, and second extendable portion 806 may be coupled to toe end 803.

First extendable portion 804 may include a plurality of segments 807, similar to segments 400 of FIG. 6. Segments 807 may be removably coupled together via at least one thread 809, similar to the at least one thread 500 of FIG. 6. Likewise, second extendable portion 806 may include a plurality of segments 808, similar to segments 400 of FIG. 6. Segments 808 may be removably coupled together via at least one thread 810, similar to the at least one thread 500 of FIG. 6.

A height sensor 880, similar to height sensor 310 of FIG. 3, may be in operable communication with extendable portions 804 and 806. Height sensor 880 may send a signal to a release mechanism (e.g., a pyro-cutter), similar to release mechanism 711 of FIG. 7, coupled to a sheer pin located through a last loop of thread 809. Height sensor 880 may be electrically coupled to the release mechanism and may send the signal to the release mechanism via wire 811. Upon receiving the signal from height sensor 880, the release mechanism may actuate, thereby dislodging the pin from thread 809. In response to the actuation of the release mechanism, segments 807 may uncouple and extendable portion 804 may convert to an extended state.

Height sensor 880 may also send a signal to a release mechanism (e.g., a pyro-cutter), similar to release mechanism 711 of FIG. 7, coupled to a pin located through a last loop of thread 810. Height sensor 880 may be electrically coupled tot the release mechanism and may send the signal to the release mechanism via a wire 813. Upon receiving the signal from height sensor 880, the release mechanism may actuate, thereby dislodging the pin from thread 810. In response to the actuation of the release mechanism, segments 808 may uncouple and extendable portion 806 may convert to an extended state.

Extendable portion 804 and/or extendable portion 806 may remain compressed in response to a distance 816 between a sill 888 of aircraft 800 and surface 818 being less than or equal to a threshold distance and may extend in response to distance 816 being greater than the threshold distance. In various embodiments, distance 816 being greater than a first threshold distance and less than or equal to a second threshold distance may cause height sensor 880 to order actuation of only the pyro-cutter coupled to thread 809 (i.e., height sensor 880 does not send a signal to actuate the pyro-cutter coupled to thread 810 when distance 816 is less than the second threshold distance). Distance 816 being greater than the second threshold distance may cause height sensor 880 to send a first signal, via wire 811, to actuate the release mechanism coupled to thread 809, and to send a second signal, via wire 813, to actuate the release mechanism coupled to thread 810. In various embodiments, the first signal and the second signal may be sent simultaneously.

Extendable portion 804 and/or extendable portion 806 may remain compressed in response to a pitch angle of aircraft 800, a roll angle of aircraft 800, or an angle of main body 802 relative to vertical being less than or equal to a first predetermined threshold and may extend in response to the pitch angle of aircraft 800, the roll angle of aircraft 800, or the angle of main body 802 relative to vertical being greater than the threshold. In various embodiments, the pitch angle of aircraft 800, the roll angle of aircraft 800, or the angle of main body 802 relative to vertical being greater than a first threshold and less than or equal to a second threshold distance may cause height sensor 880 to order actuation of only the release mechanism coupled to thread 809 (i.e., height sensor 880 does not send a signal to actuate the release mechanism coupled to thread 810 when the pitch angle of aircraft 800, the roll angle of aircraft 800, or the angle of main body 802 relative to vertical is less than the second threshold). The pitch angle of aircraft 800, the roll angle of aircraft 800, or the angle of main body 802 relative to vertical being greater than the second threshold distance may cause height sensor 880 to send a first signal, via wire 811, to actuate the release mechanism coupled to thread 809, and to send a second signal, via wire 813, to actuate the release mechanism coupled to thread 810. In various embodiments, the first signal and the second signal may be sent simultaneously.

Figure 10A:
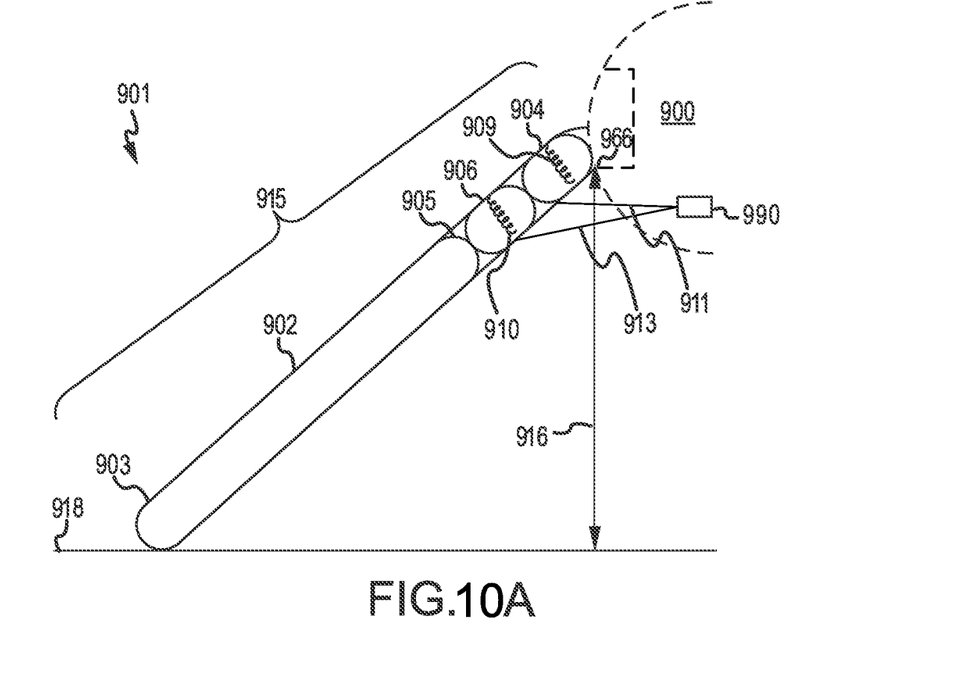

Turning now to FIG. 10A, an evacuation assembly 901 for aircraft 900 including an evacuation slide assembly 915 and a height sensor 990 is illustrated, according to various embodiments. Evacuation slide assembly 915 may have a first extendable portion 904, a second extendable portion 906, and a main body 902. First extendable portion 904 and second extendable portion 906 may have features similar to first extendable portion 804 and second extendable portion 806 of FIG. 9 and may operate in manner similar to first extendable portion 804 and second extendable portion 806 of FIG. 9. However, as opposed to evacuation slide assembly 815 of FIG. 8, both extendable portions 904, 906 are positioned on a head end 905 of main body 902. A height sensor 990, similar to height sensor 310 of FIG. 3, may be in operable communication with extendable portions 904 and 906. In various embodiments, evacuation slide assembly 915 may have one or more extendable portions on one or both of head end 905 or toe end 903 of main body 902.

Height sensor 990 may be in operable communication with extendable portions 904 and 906. Height sensor 990 may send a signal, via a wire 911, to a release mechanism, (e.g., a pyro-cutter), similar to release mechanism 711 of FIG. 7, coupled to a pin located through a last loop of thread 909. Upon receiving the signal from height sensor 990, the release mechanism may actuate, thereby dislodging the pin from thread 909. In response to the actuation of the release mechanism, extendable portion 904 may convert to an extended state.

Height sensor 990 may also send a signal, via a wire 913, to a release mechanism (e.g., a pyro-cuter), similar to release mechanism 711 of FIG. 7, coupled to a pin located through a last loop of thread 910. Upon receiving the signal from height sensor 990, the release mechanism may actuate, thereby dislodging the pin from thread 910. In response to the actuation of the release mechanism, extendable portion 906 may convert to an extended state.

Depending upon a distance 916 between a sill 966 of aircraft 900 and a surface 918, a pitch angle of aircraft 900, a roll angle of aircraft 900, or an angle of main body 902 relative to vertical one or both of the extendable portions 904, 906 may extend. For example, if distance 916 between sill 966 and surface 918 is greater than a first threshold distance and less than a second threshold distance then only one of the extendable portions 904, 906 may extend. However, if the distance 916 is greater than the first threshold distance and the second threshold distance then both first extendable portion 904 and second extendable portion 906 may extend.

Figure 10B:
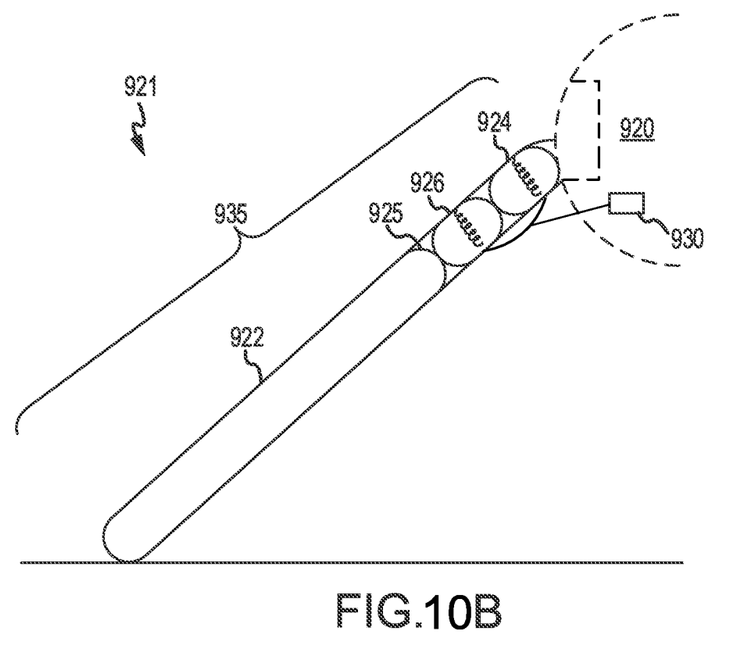

Turning now to FIG. 10B, an evacuation system 921 for aircraft 920 may have an evacuation slide assembly 935 comprising a first extendable portion 924, a second extendable portion 926, and a main body 922. First extendable portion 924 and second extendable portion 926 may have similar features to first extendable portion 904 and second extendable portion 906 of FIG. 10A. Both extendable portions 924, 926 are positioned on a head end 925 of main body 922. Evacuation slide assembly 935 may include a release mechanism (e.g., a pyro-cutter), similar to release mechanism 711 of FIG. 8A, capable of releasing both extendable portions 924, 926. Upon receiving a signal from a height sensor 930, similar to height sensor 310 of FIG. 3, the release mechanism may dislodge a pin causing both extendable portions 924, 926 to convert to an extended state.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An evacuation slide assembly for an aircraft, comprising:
a main body including a head end configured to attached to a sill of the aircraft, and a toe end opposite the head end, the main body being configured to extend from the sill of the aircraft toward a surface within a range of angles relative to vertical when deployed so as to allow persons to safely slide down the main body to the surface;
a first extendable portion coupled to the head end of the main body;
a height sensor in operable communication with the first extendable portion, the height sensor being configured to determine at least one of a roll angle of the aircraft, a pitch angle of the aircraft, or an angle of the main body relative to vertical, wherein the height sensor is configured to determine a distance between the sill of the aircraft and the surface based on the at least one of the roll angle of the aircraft, the pitch angle of the aircraft, or the angle of the main body relative to vertical, and wherein the first extendable portion is configured to deploy to adjust for a variation in a positional relationship between the surface and the sill to maintain the main body within the range of angles.

2. The evacuation slide assembly of claim 1, further comprising a first cutter configured to actuate and release the first extendable portion in response to the height sensor determining at least one of the distance between the sill and the surface, the roll angle of the aircraft, the pitch angle of the aircraft, or the angle of the main body relative to vertical exceeds a first threshold.

3. The evacuation slide assembly of claim 2, wherein the first cutter comprises a first knife edge and a second knife edge, the first knife edge configured to be driven towards the second knife edge in response to actuation of the first cutter.

4. The evacuation slide assembly of claim 2, wherein the first cutter comprises a pyrotechnic package.

5. The evacuation slide assembly of claim 2, further including:
a second extendable portion coupled to the main body; and
a second cutter configured to actuate and release the second extendable portion in response to the height sensor determining the at least one of the distance between the sill and the surface, the roll angle of the aircraft, the pitch angle of the aircraft, or the angle of the main body relative to vertical exceeds a second threshold different from the first threshold.

6. The evacuation slide assembly of claim 2, further comprising:
at least one thread configured to lace a first segment and a second segment of the first extendable portion together; and
a pin coupled to the first cutter, wherein the pin is coupled to the at least one thread and configured to loosen the at least one thread to allow the first extendable portion to extend.

7. The evacuation slide assembly of claim 6, wherein the first extendable portion includes an extendable tube in fluid communication with the main body and configured to receive pressurized air from the main body and inflate in response to the at least one thread being loosened.

8. The evacuation slide assembly of claim 7, wherein:
the first segment of the first extendable portion comprises a first distal end and a first proximal end opposite the first distal end;
the second segment of the first extendable portion comprises a second distal end and a second proximal end opposite the second distal end; and
the first distal end is configured to be adjacent the second distal end when the first extendable portion is in a packed state and to be distal the second distal end when the first extendable portion is in an extended state.

9. The evacuation slide assembly of claim 8, wherein:
the first distal end and the second distal end each define a plurality of openings;
the at least one thread is configured to extend through each of the plurality of openings and form corresponding loops in a first direction;
each loop is configured to be threaded through an adjacent loop; and
a last loop is configured to be coupled to the pin such that the pin releases the last loop in response to actuation of the first cutter.

10. An evacuation system for an aircraft, comprising:
an evacuation slide assembly comprising:
a main body including a head end configured to attached to a sill of the aircraft, and a toe end configured to extend toward a surface when the main body is deployed, and
an extendable portion coupled to the main body,
a height sensor configured to determine a sill height based on at least one of a roll angle of the aircraft, a pitch angle of the aircraft, or an angle of the main body relative to vertical, and wherein the height sensor is configured output an electrical signal in response to the height sensor determining at least one of the sill height, the roll angle of the aircraft, the pitch angle of the aircraft, or the angle of the main body relative to vertical exceeds a predetermined threshold; and
a release mechanism electrically coupled to the height sensor and configured to actuate in response to receiving the electrical signal output from the height sensor.

11. The evacuation system of claim 10, wherein the extendable portion comprises an extendable tube in fluid communication with the main body and configured to receive pressurized air from the main body.

12. The evacuation system of claim 11, wherein the extendable portion further comprises:
a first segment having a first distal end and a first proximal end opposite the first distal end; and
a second segment having a second distal end and a second proximal end opposite the second distal end, wherein the first distal end is configured to be adjacent the second distal end when the extendable portion is in a packed state and to be distal the second distal end when the extendable portion is in an extended state.

13. The evacuation system of claim 12, wherein:
the first distal end and the second distal end each define a plurality of openings;
at least one thread is configured to extend through each of the plurality of openings and form corresponding loops in a first direction;
each loop is configured to be threaded through an adjacent loop; and
a last loop is coupled to a pin.

14. The evacuation system of claim 13, wherein the pin is coupled to the release mechanism.

15. The evacuation system of claim 10, wherein the release mechanism comprises a cutter including a first knife edge and a second knife edge, the first knife edge configured to be driven towards the second knife edge in response to actuation of the cutter.

16. The evacuation system of claim 10, wherein the release mechanism comprises a pyrotechnic package.

17. An evacuation system for an aircraft, comprising:
an evacuation slide assembly comprising:
a main body having a head end and a toe end, the head end being configured to be nearer the aircraft than the toe end when the evacuation slide assembly is deployed, wherein the toe end is configured to extend toward a surface when the main body is deployed;

an extendable portion in operable communication with the main body and configured to alter an angle of the main body relative to vertical when the evacuation slide assembly is deployed such that the angle is maintained within a selected range; and a height sensor configured to determine a distance between the head end and the surface based on at least one of a roll angle of the aircraft, a pitch angle of the aircraft, or the angle of the main body relative to vertical, wherein the height sensor is configured output an electrical signal in response to the height sensor determining at least one of the distance between the head end and the surface, the roll angle of the aircraft, the pitch angle of the aircraft, or the angle of the main body relative to vertical exceeds a predetermined threshold.

18. The evacuation system of claim 17, further including a release mechanism operably coupled to the extendable portion, wherein the release mechanism is electrically coupled to the height sensor and configured to actuate in response to receiving the electrical signal output from the height sensor.

19. The evacuation system of claim 18, wherein the evacuation system further comprises:

at least one thread configured to lace a first segment and a second segment of the extendable portion together; and a pin coupled to the at least one thread and configured to loosen the at least one thread and allow the extendable portion to extend in response to an actuation of the release mechanism.

20. The evacuation system of claim 18, wherein the release mechanism of the extendable portion comprises a pyrotechnic package.

* * * * *